United States Patent
Seligmann et al.

(10) Patent No.: US 8,234,305 B2
(45) Date of Patent: Jul. 31, 2012

(54) METHOD FOR DETERMINING COMMUNICATIVE VALUE

(75) Inventors: Doree Duncan Seligmann, New York, NY (US); Ajita John Singh, Holmdel, NJ (US); Shreeharsh Kelkar, Summit, NJ (US)

(73) Assignee: Avaya Inc., Basking Ridge, NJ (US)

( * ) Notice: Subject to any disclaimer, the term of this patent is extended or adjusted under 35 U.S.C. 154(b) by 315 days.

(21) Appl. No.: 12/570,567

(22) Filed: Sep. 30, 2009

(65) Prior Publication Data

US 2011/0078155 A1    Mar. 31, 2011

(51) Int. Cl.
*G06F 17/00* (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

2007/0078714 A1 *   4/2007   Ott et al. .................... 705/14

* cited by examiner

*Primary Examiner* — Isaac M Woo (57) ABSTRACT

A method of determining which users are experts and which tags are appropriate without some of the disadvantages of the prior art is described. The level of a user's expertise is determined based on previous tags, the categorization of one or more tags, and the rating of the tags previously left by the user. The appropriateness of a tag is based on previous tagging of information by the user, by the number of times a user has tagged information with the same categorization, and the rating of a user.

19 Claims, 8 Drawing Sheets

Figure 2

Display 200

METHOD FOR DETERMINING COMMUNICATIVE VALUE

CROSS REFERENCE TO RELATED APPLICATIONS

This application is related to U.S. patent application Ser. No. 12/570,618, entitled "Social Network User Interface," filed on the same date as this application, which is incorporated by reference.

If there are any contradictions or inconsistencies in language between this application and the cases that have been incorporated by reference that might affect the interpretation of the claims in this case, the claims in this case should be interpreted to be consistent with the language in this case.

FIELD OF THE INVENTION

The present invention relates to telecommunications in general, and, more particularly, to social networks.

BACKGROUND OF THE INVENTION

The amount of information available on an individual computer or network is often overwhelming. The information available on the Internet is simply astronomical. The information comprises data such as text, audio, and video. Increasingly, information such as telephone calls and video conferences are being recorded and archived alongside all the other information.

In a library, books are shelved by subject. Astronomy books are on the shelf together, young adult novels have their own section, etc. What do libraries do with young adult novels that take place in space? Librarians had to pick a section in the library and place the one book there or purchase multiple books.

Digital information is different. Because there are no physical shelves, the same information can be categorized in multiple ways. There are no limits on the number of labels placed on information. This means that a single piece of information, such as a video, may have any number of "tags."

For the purpose of this specification, the term "tag" is defined as a non-hierarchical keyword or term assigned to a piece of information, for example and without limitation, a digital file, an internet bookmark, digital image, video, etc.

Information may be tagged in various ways. These ways include, for example and without limitation, users may assign tags, the creator(s) of the information may tag the information upon creation, tags may be assigned by a system automatically as a result of the users participating in a conference, based on word spotting, based on the time the information is produced or accessed, past user activity, etc.

Tags are useful for quickly and easily labeling information so that it can be recalled without having to worry about folder hierarchy. Because there is no limit on the number of tags, information can be labeled anything. For example, in FIG. 2, image 201-1 has the tags: Sailing, Partly Cloudy, Ocean, Summer, Rowing, and Outdoors. (In listing 202-1). The user or users "tagging" image 201-1, may associate one or more of these tags with that image. One user tags the image with "sailing" because there is a sailboat, another user tags the image with the "summer" because they perceive the image to be a summer scene, and so on.

Figure 2:
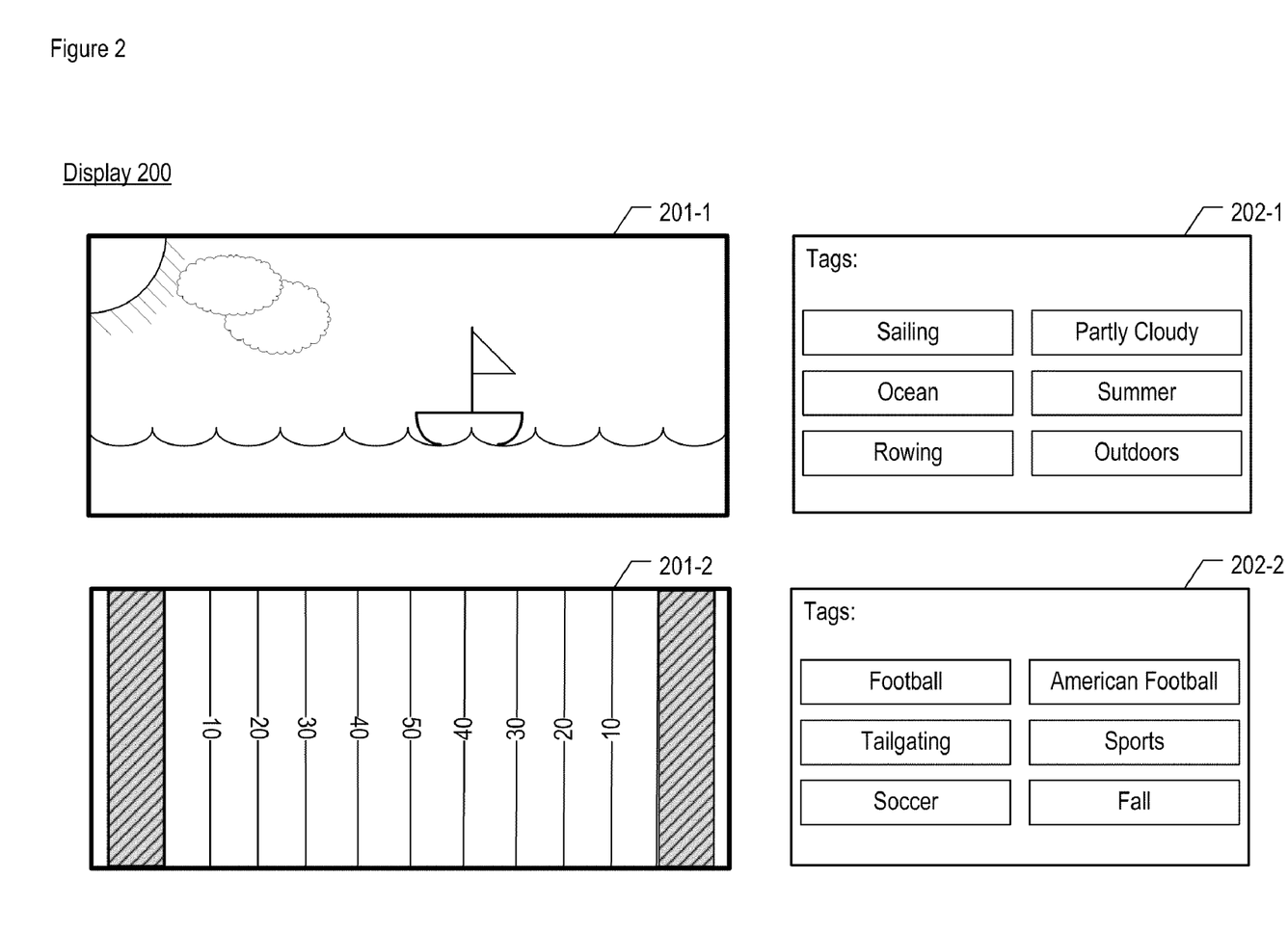
FIG. 2 depicts a schematic diagram of a portion of what is displayed to a user at a telecommunications terminal in accordance with the illustrative embodiment of the present invention.

However, one user tagged image 201-1 with the tag "rowing." It would not be accurate to describe image 201-1 as a rowing scene. If someone were to access information based on the tag "rowing," image 201-1 would show up. The problem is: How to determine the appropriateness of tags.

In the prior art, one way this was done was by limiting who can tag information. In some instances, only the user who created the information could add tags to it. In other instances, only the user who uploaded the information onto a server could add tags. Often users may provide only one perspective to the information, which may be limiting the scope of the information. In other instances users provide incorrect or dishonest tags to the information.

Sometimes the job of creating tags was given to moderators who would have to look through the information and then add tags. This creates the issue of how to determine which users have the expertise to properly tag information.

These methods also have the problem of limiting collaboration. Collaboration is desirable because certain individuals may add relevant tags that creators, uploaders, and moderators may miss. For example, an American user might tag image 201-2 as "football," but to many, image 201-2 is more accurately described as "American football." A collaborative approach may be necessary to get both tags.

SUMMARY OF THE INVENTION

The present invention provides an objective method of determining which users are experts and which tags are appropriate without some of the disadvantages of the prior art. The level of a user's expertise is determined based on previous tags, the categorization of one or more tags, and the rating of the tags previously left by the user. The appropriateness of a tag is based on previous tagging of information by the user, by the number of times a user has tagged information with the same categorization, and the rating of a user.

For the purpose of this specification, the term "communicative value" is defined as the value determined of a user's expertise or a tag's appropriateness. In accordance with the illustrative embodiment of the present invention, communicative value may be, for example and without limitation, a binary value such as "expert" or "not expert" or "appropriate" or not "appropriate," a scalar value, such as "expertise communicative value of 5," or a ranking, such that user $U_1$ has a greater communicative value than user $U_2$, (for a given subject or overall), or any such value. It will be clear to one skilled in the art, after reading this disclosure how to make and use alternative embodiments of the present invention that assign communicative values to users and tags.

For the purpose of this specification, the term "categorization" is defined as a subject into which a tag may be placed. For example, and without limitation, tags such as "football," "American football," and "soccer" may be collectively categorized as "athletics."

In accordance with the illustrative embodiment of the present invention, a user who frequently tags information with tags like "football" is generally perceived as having a higher level of expertise in football. The value assigned to that user would be higher than that of another user who less frequently tags information.

When that user tags information with the tag football, that tag is given a higher value as that tag is more likely to be appropriate to the information. Also, when that user tags information "baseball," that user has expertise in the category of "athletics" and that tag is also at a higher value.

Objectively assigning communicative values to users and tags allows for the determination of expert users and appropriate tags.

DETAILED DESCRIPTION

Figure 1:
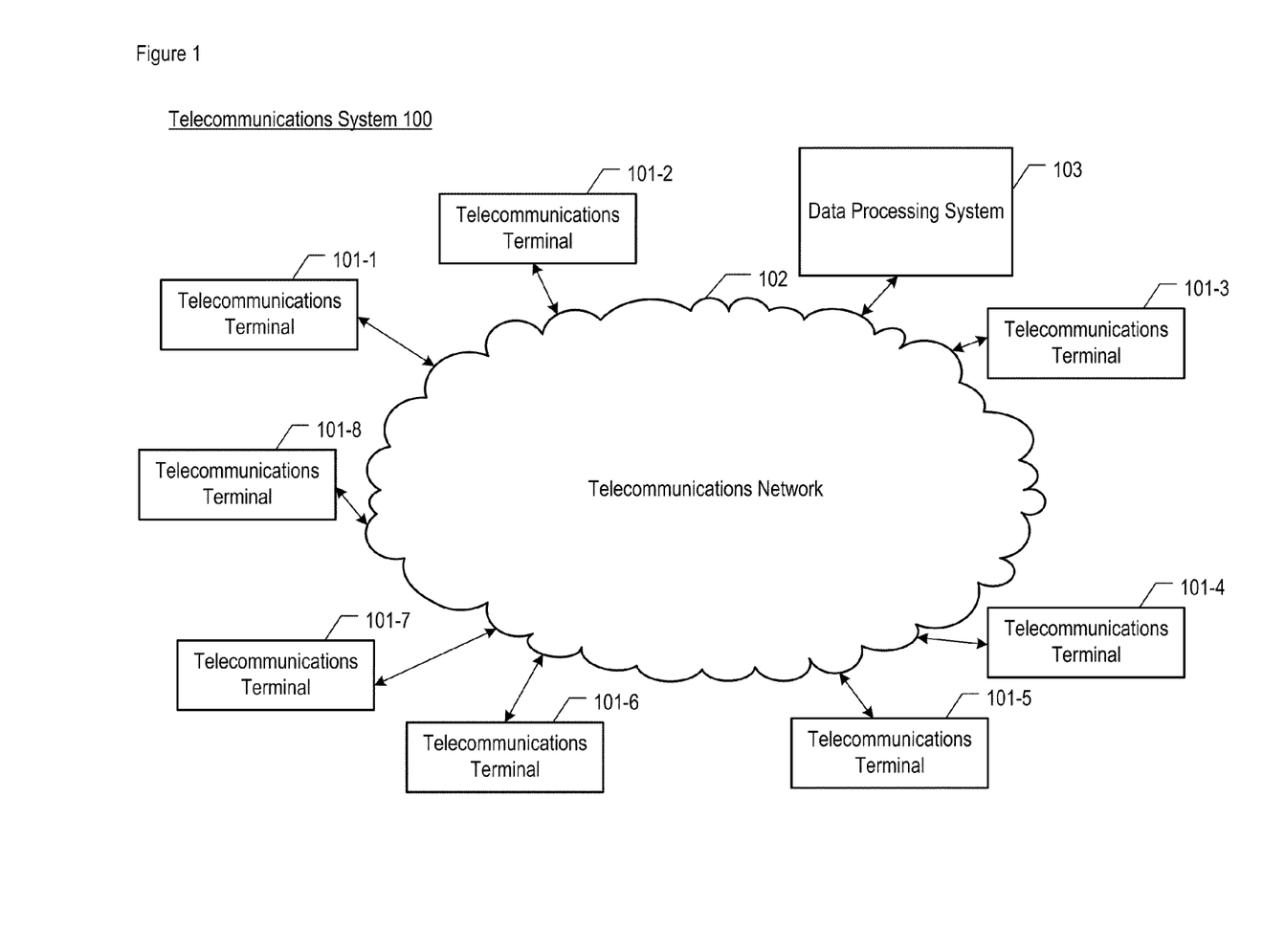
FIG. 1 depicts a schematic diagram of a portion of telecommunications system 100 in accordance with the illustrative embodiment of the present invention.

FIG. 1 depicts a schematic diagram of a portion of telecommunications system 100 in accordance with the illustrative embodiment of the present invention. Telecommunications system 100 comprises telecommunications terminals 101-1 through 101-8, telecommunications network 102, and data processing system 103.

Although telecommunications network comprises eight (8) telecommunications terminals, it will be clear to one skilled in the art, after reading this disclosure how to make and use alternative embodiments of the present invention in which there are any number of telecommunications terminals.

Although telecommunications network comprises one telecommunications network, it will be clear to one skilled in the art, after reading this disclosure how to make and use alternative embodiments of the present invention in which there are any number of telecommunications networks.

Although telecommunications network comprises one data processing system, it will be clear to one skilled in the art, after reading this disclosure, how to make and use alternative embodiments of the present invention in which there are any number of data processing systems.

Telecommunications terminals 101-1 through 101-8 are hardware and software for communicating on a telecommunications network. In accordance with the illustrative embodiment of the present invention, telecommunications terminals 101-1, through 101-8 can be either wireline terminals or wireless terminals, or a combination of both. It will be clear to one skilled in the art, after reading this disclosure, how to make and use telecommunications terminals 101-1 through 101-8.

In accordance with the illustrative embodiment of the present invention, telecommunications terminals 101-1 through 101-8 are capable of transmitting, receiving, rendering, and displaying data (including video), but it will be clear to one skilled in the art after reading this disclosure, how to make and use alternative embodiments of the present invention, in which telecommunications terminals 101-1 through 101-8, for example and without limitation, transmit and receive data and video signals without displaying them themselves, only receive data, etc. In accordance with the illustrative embodiment of the present invention, telecommunications terminals 101-1 through 101-8 are devices such as televisions, set-top boxes, personal computers, mobile telecommunications terminals, such as mobile telephones or smartphones, etc.

Telecommunications network 102 is a private network, but it will be clear to those skilled in the art, after reading this disclosure, how to make and use alternative embodiments of the present invention in which telecommunication network 102 is another network, for example and without limitation, the Public Switched Telephone Network, the Internet, a private data network, a community access television network, a cable television system, a fiber optic data network, a satellite network, etc.

Data processing system 103 is hardware and software for distributing data across telecommunications network 102. It will be clear to one skilled in the art, after reading this disclosure, how to make and use data processing system 103.

FIG. 2 depicts a schematic diagram of a portion of what is displayed to a user at a telecommunications terminal in accordance with the illustrative embodiment of the present invention. Display 200 comprises image 201-1, image 201-2, list of tags 202-1, and list of tags 202-2.

Although FIG. 2 depicts only two images, it will be clear to one skilled in the art, after reading this disclosure, how to make and use alternative embodiments of the present invention in which there are any number of images.

Although FIG. 2 depicts only two lists of tags, it will be clear to one skilled in the art, after reading this disclosure, how to make and use alternative embodiments of the present invention in which there are any number of lists.

Although FIG. 2 depicts six (6) tags in each list of tags, it will be clear to one skilled in the art, after reading this disclosure, how to make and use alternative embodiments of the present invention in which there are any number of tags.

Although image 201-1 depicts a sailing scene, it will be clear to one skilled in the art, after reading this disclosure, how to make and use alternative embodiments of the present invention in which image 201-1 depicts any scene or any information.

Although image 201-2 depicts a football field, it will be clear to one skilled in the art, after reading this disclosure, how to make and use alternative embodiments of the present invention in which image 201-2 depicts any scene or any information.

In accordance with the illustrative embodiment of the present invention, image 201-1 and image 202-2 are frames of video. However, it will be clear to one skilled in the art, after reading this disclosure, how to make and use alternative embodiments of the present invention in which image 201-1 or image 202-2 is any information.

In accordance with the illustrative embodiment of the present invention, list 202-1 and 202-2 are displayed to the user. However, it will be clear to one skilled in the art, after reading this disclosure, how to make and use alternative embodiments of the present invention in which list 202-1 or list 202-2 is not displayed to the user.

In accordance with the illustrative embodiment of the present invention, image 201-1, image 201-2, list 202-1 and list 202-2 are displayed at a telecommunications terminal. However, it will be clear to one skilled in the art, after reading this disclosure, how to make and use alternative embodiments of the present invention in which image 201-1, image 201-2, list 202-1 and list 202-2 are displayed at a different location or device or each displayed at different locations or devices, for example, and without limitation, data processing system 103, multiple telecommunications terminals, etc.

Figure 3:
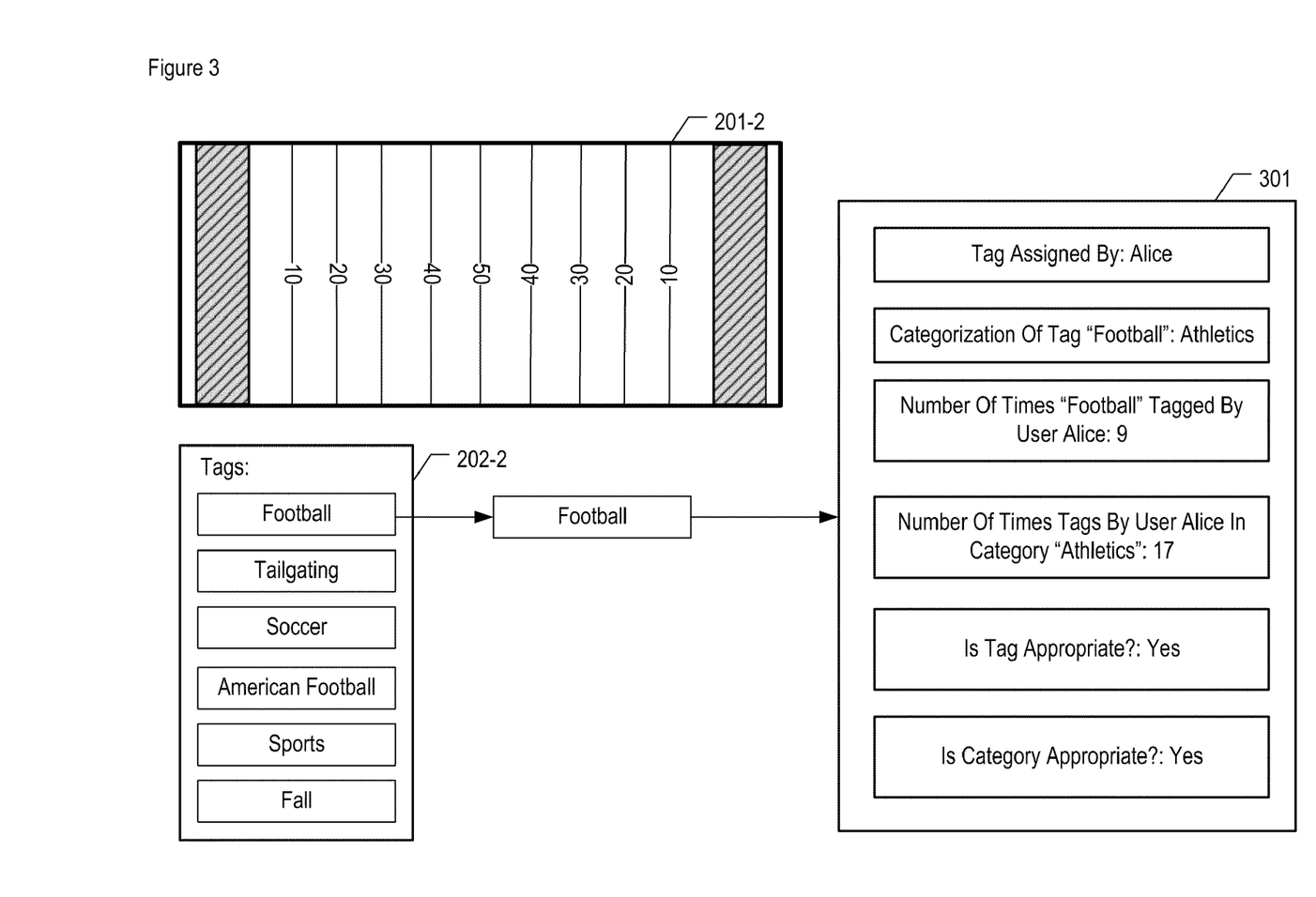
FIG. 3 depicts a schematic diagram of a portion of what is displayed to a user at a telecommunications terminal and information stored at data processing system 103 in accordance with the illustrative embodiment of the present invention.

FIG. 3 depicts a schematic diagram of a portion of what is displayed to a user at a telecommunications terminal and information stored at data processing system 103 in accordance with the illustrative embodiment of the present invention. FIG. 3 comprises image 201-2, list 202-2, and entry 301.

Although FIG. 3 depicts only one image, it will be clear to one skilled in the art, after reading this disclosure, how to make and use alternative embodiments of the present invention in which there are any number of images.

Although FIG. 3 depicts only one list of tags, it will be clear to one skilled in the art, after reading this disclosure, how to make and use alternative embodiments of the present invention in which there are any number of lists.

Although FIG. 3 depicts six (6) tags in the list of tags, it will be clear to one skilled in the art, after reading this disclosure, how to make and use alternative embodiments of the present invention in which there are any number of tags.

Although FIG. 3 depicts six (6) fields in entry 301, it will be clear to one skilled in the art, after reading this disclosure, how to make and use alternative embodiments of the present invention in which there are any number of fields.

In accordance with the illustrative embodiment of the present invention, each tag in the tag entries is associated with an entry in a database. However, it will be clear to one skilled in the art, after reading this disclosure, how to make and use alternative embodiments of the present invention in which tags are associated with another data structure.

In FIG. 3, the tag "Football" has an entry in the database in which certain fields are relevant. In accordance with the illustrative embodiment of the present invention, these fields are an identifier of the person who tagged image 201-2 with the tag "Football," (Alice), a categorization of "Football" (Athletics), the number of times the user Alice tagged information with the tag "Football" (nine times), the number of times the user Alice tagged information with a tag that fits the category "Athletics" (seventeen times), whether or not the tag is appropriate (Yes), and whether or not the category is appropriate (Yes). However, it will be clear to one skilled in the art, after reading this disclosure, how to make and use alternative embodiments of the present invention in which there are any number of categories.

Although, in accordance with the illustrative embodiment of the present invention, the issue of appropriateness is a scalar value, for example and without limitation, appropriateness is between 1 and 5 or 1 and 10 or any number, it will be clear to one skilled in the art, after reading this disclosure, how to make and use alternative embodiments of the present invention in which, for example and without limitation, appropriateness is binary ("Yes" or "No").

Figure 4:
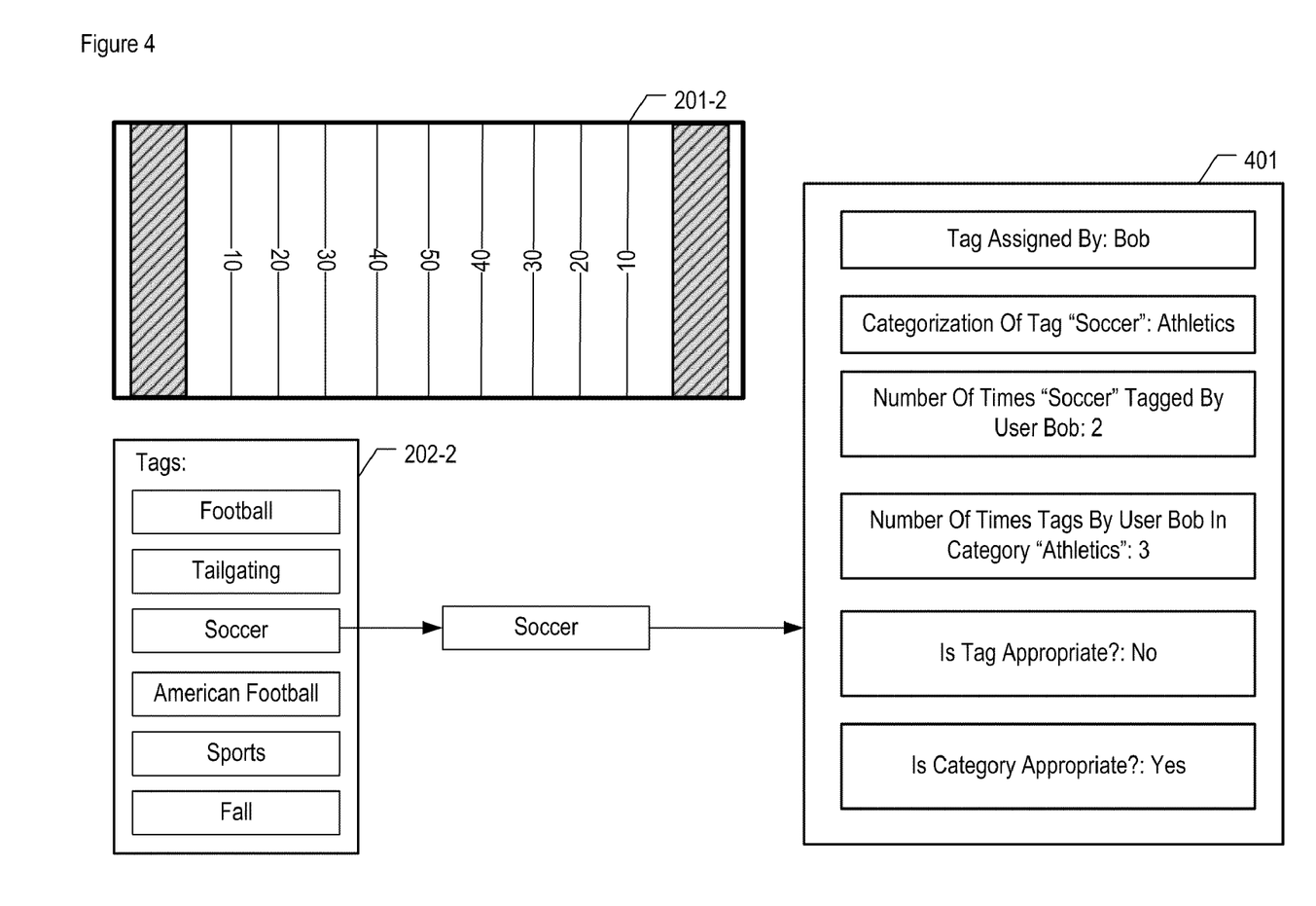
FIG. 4 depicts a schematic diagram of a portion of what is displayed to a user at a telecommunications terminal and information stored at data processing system 103 in accordance with the illustrative embodiment of the present invention.

FIG. 4 depicts a schematic diagram of a portion of what is displayed to a user at a telecommunications terminal and information stored at data processing system 103 in accordance with the illustrative embodiment of the present invention. FIG. 4 comprises image 201-2, list 202-2, and entry 401.

Although FIG. 4 depicts only one image, it will be clear to one skilled in the art, after reading this disclosure, how to make and use alternative embodiments of the present invention in which there are any number of images.

Although FIG. 4 depicts only one list of tags, it will be clear to one skilled in the art, after reading this disclosure, how to make and use alternative embodiments of the present invention in which there are any number of lists.

Although FIG. 4 depicts six (6) tags in the list of tags, it will be clear to one skilled in the art, after reading this disclosure, how to make and use alternative embodiments of the present invention in which there are any number of tags.

Although FIG. 4 depicts six (6) fields in entry 301, it will be clear to one skilled in the art, after reading this disclosure, how to make and use alternative embodiments of the present invention in which there are any number of fields.

In accordance with the illustrative embodiment of the present invention, each tag in the tag entries is associated with an entry in a database. However, it will be clear to one skilled in the art, after reading this disclosure, how to make and use alternative embodiments of the present invention in which tags are associated with another data structure.

In accordance with the illustrative embodiment of the present invention, a tag may apply to the information as a whole or a tag may be applied to only a portion of the information.

In FIG. 4, the tag "Soccer" has an entry in the database in which certain fields are relevant. In accordance with the illustrative embodiment of the present invention, these fields are an identifier of the person who tagged image 201-2 with the tag "Soccer," (Bob), a categorization of "Soccer" (Athletics), the number of times the user Bob tagged information with the tag "Soccer" (two times), the number of times the user Bob tagged information with a tag that fits the category "Athletics" (three times), whether or not the tag is appropriate (No), and whether or not the category is appropriate (Yes). However, it will be clear to one skilled in the art, after reading this disclosure, how to make and use alternative embodiments of the present invention in which there are any number of categories.

Although, in accordance with the illustrative embodiment of the present invention, the issue of appropriateness is a scalar value, for example and without limitation, appropriateness is a scalar value for example and without limitation between 1 and 5 or 1 and 10 or any number, it will be clear to one skilled in the art, after reading this disclosure, how to make and use alternative embodiments of the present invention in which appropriateness is determined in a different manner, for example and without limitation, appropriateness is a binary value ("Yes" or "No") or any rating system.

In FIG. 4, the example of the tag "Soccer," shows an inappropriate tag (it is not a soccer field, but an American football field) but an appropriate category (soccer is athletics as is football). However, it will be clear to one skilled in the art, after reading this disclosure, how to make and use alternative embodiments of the present invention, in which the tag and category are, for example and without limitation, both appropriate or both inappropriate.

Figure 5:
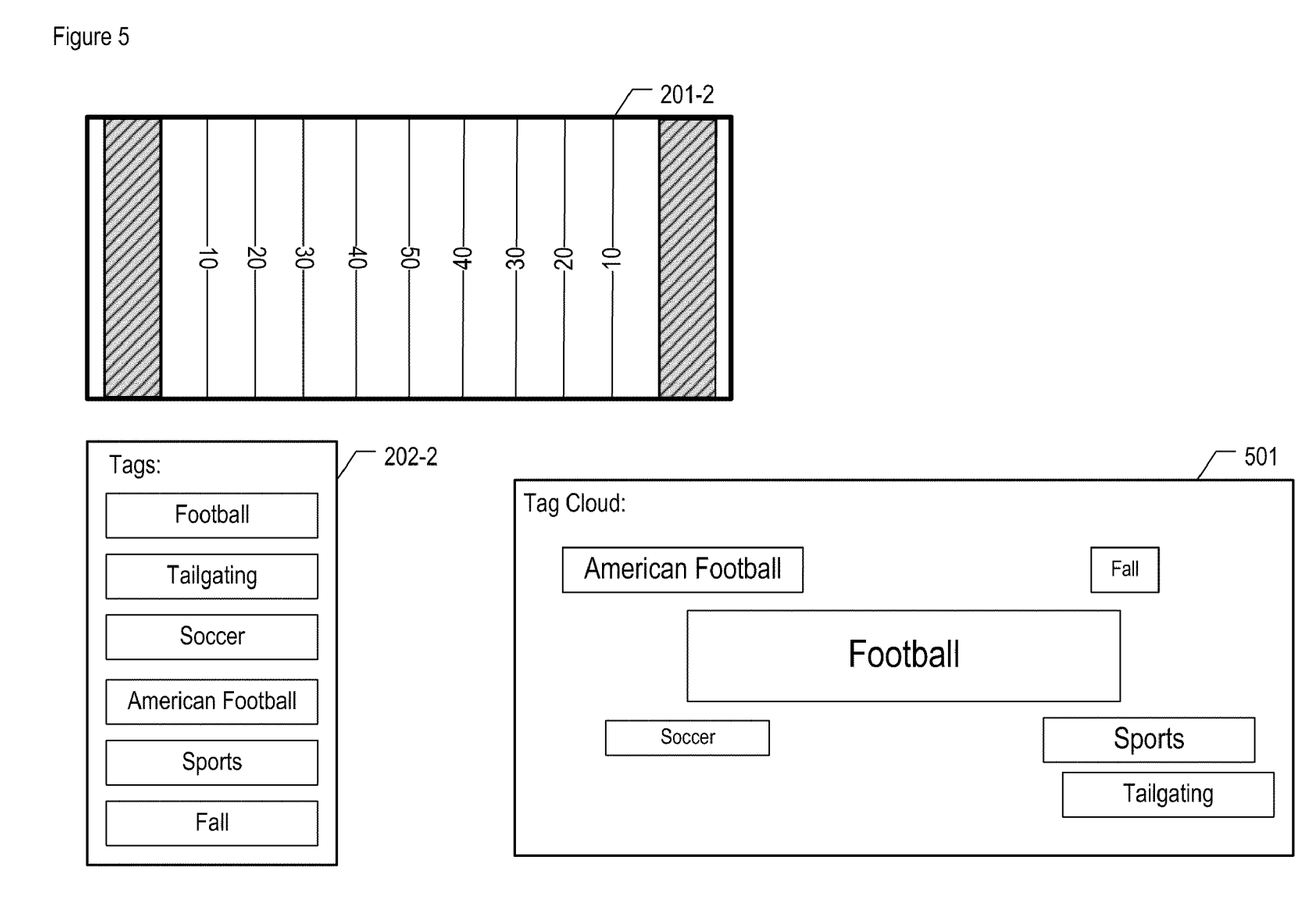
FIG. 5 depicts a schematic diagram of a portion of what is displayed to a user at a telecommunications terminal and information stored at data processing system 103 in accordance with the illustrative embodiment of the present invention.

FIG. 5 depicts a schematic diagram of a portion of what is displayed to a user at a telecommunications terminal and information stored at data processing system 103 in accordance with the illustrative embodiment of the present invention. FIG. 5 comprises image 201-2, list 202-2, and tag cloud 501. In accordance with the illustrative embodiment of the present invention, the tags in list 202-2 are represented in a tag cloud.

For the purpose of this specification, the term "tag cloud" is defined as a visual depiction of tags. In a tag cloud, the tags are often listed alphabetically, and the importance of a tag is shown with font size or color. For example and without limitation, the more popular a tag, the larger it appears in a tag cloud. Thus both finding a tag by alphabet and by popularity is possible. The tags are usually hyperlinks that lead to a collection of items that are associated with the tag.

Although FIG. 5 depicts only one image, it will be clear to one skilled in the art, after reading this disclosure, how to make and use alternative embodiments of the present invention in which there are any number of images.

Although FIG. 4 depicts only one list of tags, it will be clear to one skilled in the art, after reading this disclosure, how to make and use alternative embodiments of the present invention in which there are any number of lists.

Although FIG. 5 depicts six (6) tags in the list 202-2, it will be clear to one skilled in the art, after reading this disclosure, how to make and use alternative embodiments of the present invention in which there are any number of tags.

Although FIG. 5 depicts six (6) tags in the tag cloud 501, it will be clear to one skilled in the art, after reading this disclosure, how to make and use alternative embodiments of the present invention in which there are any number of tags.

In accordance with the illustrative embodiment of the present invention, tag cloud 501 has the same tags as in list 202-2, but they are displayed in a different manner. The tags listed in tag cloud 501 are of different size and different ordering. The tags are listed in descending size order by frequency. That is, the largest tag in tag cloud 501, "Football," appears most frequently as applied to the information expressed in image 201-2. However, it will be clear to one skilled in the art, after reading this disclosure how to make and use alternative embodiments of the present invention in which the ordering is different, for example and without limitation, the tags appear in increasing size by order of frequency, the tags appear in order of rating, the tags appear in descending order by the level of expertise of the user that assigned the tag, etc.

Also, in accordance with the illustrative embodiment of the present invention, the tags in tag cloud 501 are also in alphabetical order from top to bottom and left to right. That is, the top, left tag in tag cloud 501, "American Football," is comes before the next tag, "Fall," in alphabetical order. However, it will be clear to one skilled in the art, after reading this disclosure how to make and use alternative embodiments of the present invention in which the ordering is different, for example and without limitation, the tags appear in the opposite of alphabetical order, that the tags are listed right to left, that the tags are listed bottom to top, etc.

Also, in accordance with the illustrative embodiment of the present invention, the largest tag in tag cloud 501 appears in the middle of tag cloud 501. However, it will be clear to one skilled in the art, after reading this disclosure how to make and use alternative embodiments of the present invention in which the largest tag appears anywhere in tag cloud 501.

Figure 6:
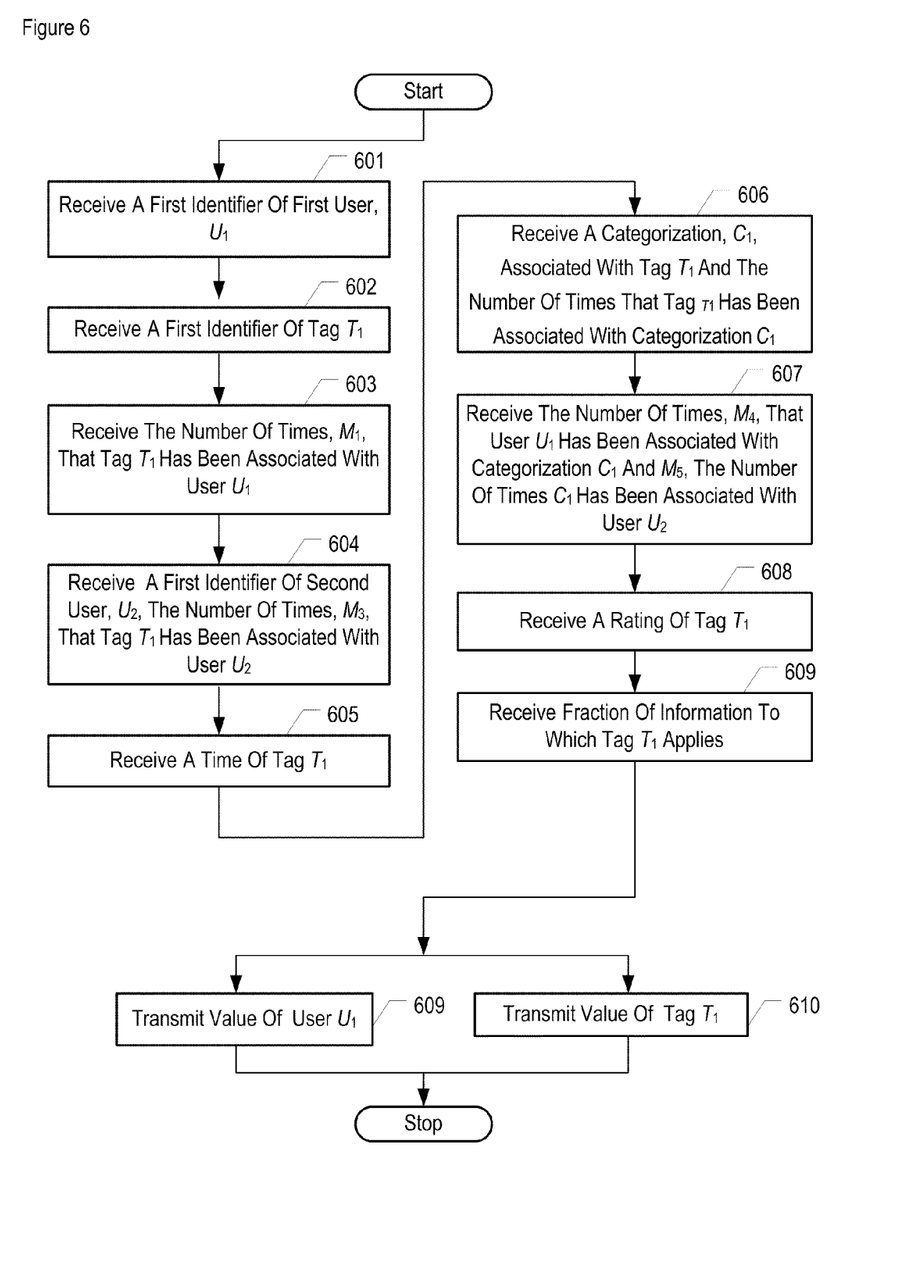
FIG. 6 depicts a flowchart of the salient tasks associated with the operation of the illustrative embodiment of the present invention.

FIG. 6 depicts a flowchart of the salient tasks associated with the operation of the illustrative embodiment of the present invention.

In accordance with the illustrative embodiment of the present invention, the tasks outlined in FIG. 6 are performed at data processing system 103. However, it will be clear to one skilled in the art, after reading this disclosure, how to make and use other implementations of the present invention in which some or all of the steps are performed by another device, for example, and without limitation, a telecommunications terminal, a separate data processing system, a television, a server, etc.

Although, in accordance with the illustrative embodiment of the present invention, the tasks outlined in FIG. 6 are performed only once, it will be clear to one skilled in the art, after reading this disclosure, how to make and use alternative embodiments of the present invention in which the tasks are performed any number of times, for example, and without limitation, the tasks are performed on a continuous basis.

At task 601, data processing system 103 receives a first identifier of first user, $U_1$. In accordance with the illustrative embodiment of the present invention, the identifier may be the name of the user. However, it will be clear to one skilled in the art, after reading this disclosure, how to make and use alternative embodiments of the present invention in which the identifier is some other information, for example and without limitation, an identification number, a pointer to a database entry, etc.

At task 602, data processing system 103 receives first identifier of tag $T_1$. In accordance with the illustrative embodiment of the present invention, the identifier may be the name of the tag. However, it will be clear to one skilled in the art, after reading this disclosure, how to make and use alternative embodiments of the present invention in which the identifier is some other information, for example and without limitation, an identification number, a pointer to a database entry, etc.

At task 603, data processing system 103 receives the number of times, $M_1$, that tag $T_1$ has been associated with user $U_1$.

At task 604, data processing system 103 receives a first identifier of second user, $U_2$, and receives the number of times, $M_3$, that tag $T_1$ has been associated with user $U_2$.

At task 605, data processing system 103 receives a time of tag $T_1$. In accordance with the illustrative embodiment of the present invention, the time received is a calendrical time. However, it will be clear to one skilled in the art, after reading this disclosure, how to make and use alternative embodiments of the present invention in which the time is represented in another fashion.

For the purposes of the specification and claims, the term "calendrical time" is defined as indicative of one or more of the following:
 (i) a time (e.g., 16:23:58, etc.),
 (ii) a date (e.g., Sep. 25, 2009, etc.),
 (iii) one or more temporal designations (e.g., Tuesday, November, etc.),
 (iv) one or more events (e.g., Thanksgiving, John's birthday, etc.), and
 (v) a time span (e.g., 8:00 pm to 9:00 pm, etc.).

At task 606, data processing system 103 receives a categorization, $C_1$, associated with tag $T_1$. In accordance with the illustrative embodiment of the present invention, the categorization may be a general category for tag, for example and without limitation, the tag "football" may have the categorization "athletics." Although, in accordance with the illustrative embodiment of the present invention, a tag has only one categorization, it will be clear to one skilled in the art, after reading this disclosure, how to make and use alternative embodiments of the present invention, in which a tag has any number of categorizations.

At task 607, data processing system 103 receives the number of times, $M_4$, that user $U_1$ has been associated with categorization $C_1$ and $M_5$, that user $U_2$ has been associated with categorization $C_1$.

At task 608, data processing system 103 receives a rating of tag $T_1$.

At task 609, data processing system 103 receives the fraction of the information to which tag $T_1$ applies. data processing system 103 transmits the value of user $U_1$. This task is further detailed in FIG. 6.

At task 610, data processing system 103 transmits the value of tag $T_1$. This task is further detailed in FIG. 7.

It will be clear to one skilled in the art, after reading this disclosure, how to make and use other implementations of the present invention in which one or more of the steps are omitted or are performed in a different order than the one presented or simultaneously.

Figure 7:
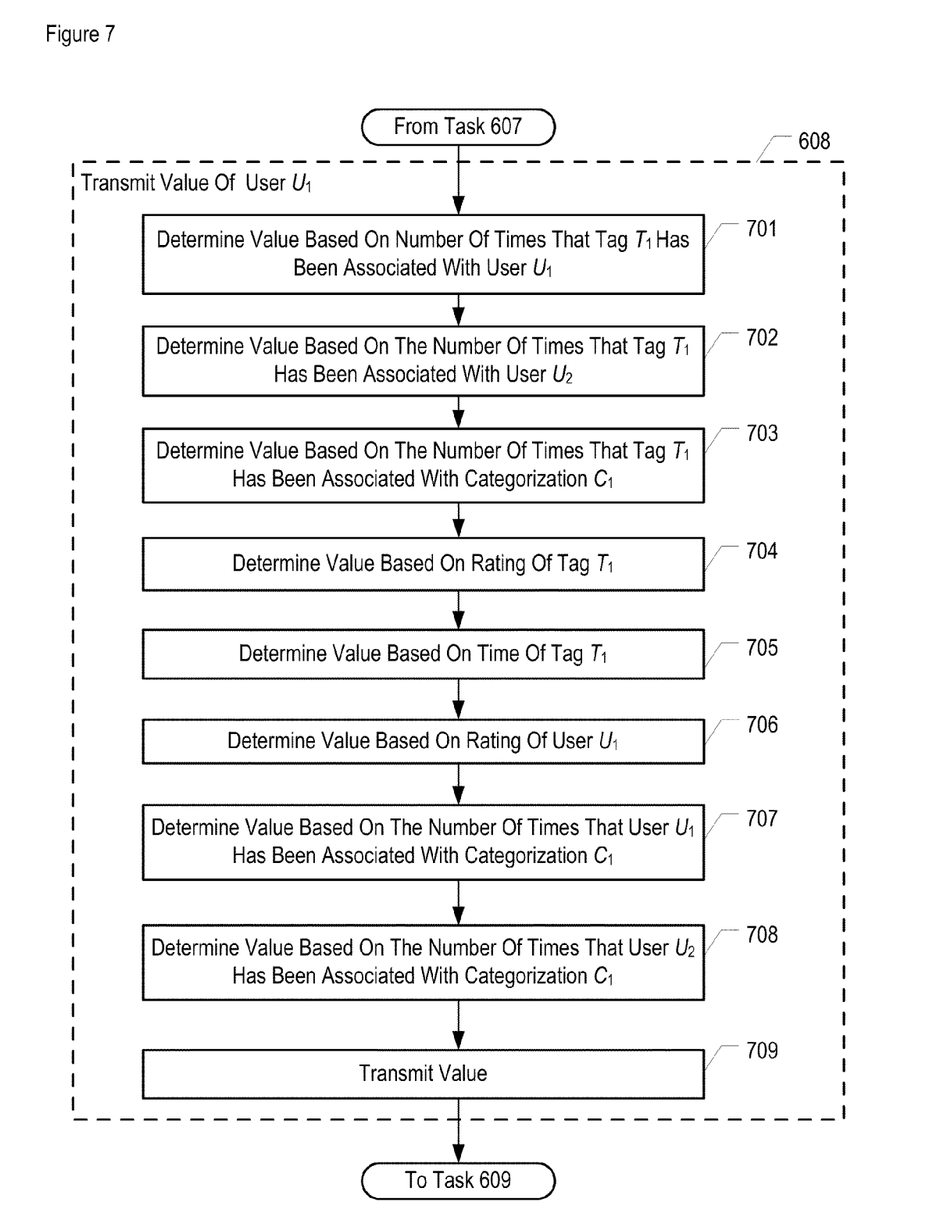
FIG. 7 depicts a flowchart of the salient tasks associated with the operation of task 609 in accordance with the illustrative embodiment of the present invention.

FIG. 7 depicts a flowchart of the salient tasks associated with the operation of task 609 in accordance with the illustrative embodiment of the present invention.

In accordance with the illustrative embodiment of the present invention, value of user $U_1$ is based on the values received in tasks 603, 605, 607, and 608. However it will be clear to one skilled in the art, after reading this disclosure, how to make and use alternative embodiments of the present invention in which one or more of the values are omitted when determining the value transmitted.

At task 701, the value of user $U_1$ is based on the number of times that tag $T_1$ has been associated with user $U_1$. In accordance with the illustrative embodiment of the present invention, the more times tag $T_1$ has been associated with user $U_1$, the greater the likelihood that user $U_1$ has expertise in the field. This is because users are inclined to tag data in fields in which they are expert. The more times Alice tags items with football, the more likely she is a football expert. Conversely, the fewer times tag $T_1$ has been associated with user $U_1$, the less the likelihood that user $U_1$ has expertise in the field At task 702, the value of user $U_1$ is based on the number of times that tag $T_1$ has been associated with user $U_2$ relative to the number of times that tag $T_1$ has been associated with user $U_1$. In accordance with the illustrative embodiment of the present invention, if the number of times, $M_3$, that tag $T_1$ has been associated with user $U_2$ is greater than $M_1$, then user $U_2$ has greater expertise than user $U_1$. Because Alice employs the tag "football" more than Bob does, she is more likely the greater football expert.

In other words: If $M_3 > M_1$ then value of user $U_2$ > the value of user $U_1$.

Also, in accordance with the illustrative embodiment of the present invention, the converse would be true: If $M_3 < M_1$ then value of user $U_2$ < the value of user $U_1$. However, it will be clear to one skilled in the art after reading this disclosure, how to make and use alternative embodiments of the present invention in which if, for example and without limitation, $M_3 = M_1$ or they are very close, that the value of user $U_1$ would be close or equal.

In accordance with an alternative embodiment of the present invention, the more often that $M_3 = M_1$ or they are very close, the value of the tags given by user $U_1$ is greater as applied to user $U_2$ as the users have similar levels of expertise, are interested in the same fields, or have high "social cohesion" levels.

At task 703, the value of user $U_1$ is based on the number of times that tag $T_1$ has been associated with categorization $C_1$. In accordance with the illustrative embodiment of the present invention, the tag "football" is associated with the categorization "athletics."

For example, and without limitation, the value of user $U_1$ is based on the number of times that categorization $C_1$ has been associated with user $U_1$ in that the more times categorization $C_1$ has been associated with user $U_1$, the more expertise user $U_1$ has in the field. Categorization $C_1$ is also associated with tag $T_1$. This is because users are inclined to tag data in fields in which they are expert. The more times Alice tags items in the field of athletics, the more likely she is a football expert.

It will be clear to one skilled in the art after reading this disclosure, how to make and use alternative embodiments of the present invention in which the value of user $U_1$ is based on the relative number of times categorization $C_1$ is used.

At task 704, the value of user $U_1$ is based on a rating of tag $T_1$. In accordance with the illustrative embodiment of the present invention this rating may be received, for example and without limitation, by ratings given by other users, by a value of the tag determined at step 609, by a random selection, etc.

In accordance with the illustrative embodiment of the present invention the value may be a binary value such as, for example and without limitation, "appropriate" or "not appropriate", "good" or "bad," or "relevant" or "not relevant," or any such rating. Also, in accordance . . . the rating may be a scalar value, such as, for example and without limitation, between 1 and 5 ("Between 1 and 5, how appropriate is this tag?"), between 1 and 10, or any scalar value.

For example, and without limitation, the greater the value given to the tag, the greater the level of expertise of the user who assigned the tag. If Bob assigned image 201-2 with the tag "soccer," then Bob must not be an expert in that field because he is clearly mistaken. Thus, in entry 401, the tag is rated as not appropriate.

At task 705, the value of user $U_1$ is based on the time of tag $T_1$. In accordance with the illustrative embodiment of the present invention, this is done by a decay function with the decay starting at the time that tag $T_1$ was assigned. In other words, the longer the time from the time that the tag $T_1$ was assigned to the time the determination is made, the less weight that tag $T_1$ is given.

Although, in accordance with the illustrative embodiment of the present invention, this is done by a decay function, it will be clear to one skilled in the art, after reading this disclosure, how to make and use alternative embodiments of the present invention in which the value is determined by another function, for example and without limitation, a linear function.

In accordance with the illustrative embodiment of the present invention, the decay function is an exponential decay. However, it will be it will be clear to one skilled in the art, after reading this disclosure, how to make and use alternative embodiments of the present invention in which the value is determined by another function, for example and without limitation, a linear decay.

It will be it will be it will be clear to one skilled in the art, after reading this disclosure, how to make and use alternative embodiments of the present invention that perform the tasks associated with task 705.

At task 706, the value of user $U_1$ is based on a rating of user $U_1$. In accordance with the illustrative embodiment of the present invention, this rating may be received, for example and without limitation, by ratings given by other users, by a value of the tag determined at tasks 601-605, by a random selection, etc.

In accordance with the illustrative embodiment of the present invention, the value may be a binary value such as, for example and without limitation, "expert" or "not expert", or any such rating. Also, in accordance . . . the rating may be a scalar value, such as, for example and without limitation, between 1 and 5 ("Between 1 and 5, what is the expertise of user $U_1$?"), between 1 and 10, or any scalar value.

For example, and without limitation, the rating of the user who assigned the tag, the greater the value given to the user. If Bob assigned image 201-2 with the tag "soccer," must not be an expert in that field because he is clearly mistaken. In this case Bob may be rated down by other users.

Although, in accordance with the illustrative embodiment of the present invention, the value determined for user $U_1$ at task 706 is based on the rating of only user $U_1$, it will be clear to one skilled in the art, after reading this disclosure, how to make and use alternative embodiments of the present invention in which the value is relative to a rating of user $U_2$, an average user rating, etc.

At task 707, the value of user $U_1$ is based on the number of times that category $C_1$ has been associated with user $U_1$. In accordance with the illustrative embodiment of the present invention, the more times category $C_1$ has been associated with user $U_1$, the greater the likelihood that user $U_1$ has expertise in the field. This is because users are inclined to tag data in fields in which they are expert. The more times Alice tags items with in the category of athletics, the more likely she is an athletics expert. Conversely, the fewer times category $C_1$ has been associated with user $U_1$, the less the likelihood that user $U_1$ has expertise in the field At task 708, the value of user $U_1$ is based on the number of times, $M_5$ that category $C_1$ has been associated with user $U_2$ relative to the number of times, $M_4$, that category $C_1$ has been associated with user $U_1$. In accordance with the illustrative embodiment of the present invention, if the number of times that category $C_1$ has been associated with user $U_2$ is greater than the number of times it is associated with user $U_1$ then user $U_2$ has greater expertise than user $U_1$. Because Alice employs the category "athletics" more than Bob does, she is more likely the greater athletics expert.

In other words: If $M_5 > M_4$ then value of user $U_2 >$ the value of user $U_1$.

Also, in accordance with the illustrative embodiment of the present invention, the converse would be true: If $M_5 > M_4$ then value of user $U_2 <$ the value of user $U_1$. However, it will be clear to one skilled in the art after reading this disclosure, how to make and use alternative embodiments of the present invention in which if, for example and without limitation, $M_5 = M_4$ or they are very close, that the value of user $U_1$ would be close or equal.

In accordance with an alternative embodiment of the present invention, the more often that $M_5 = M_4$ or they are very close, the value of user $U_1$ is greater as applied to user $U_2$ as the users have similar levels of expertise, are interested in the same fields, or have high "social cohesion" levels. In this the value of $U_1$ is determined relative to $U_2$ and may have a different value dependent on the user to which user $U_1$ is compared.

At task 709, the value is transmitted.

It will be clear to one skilled in the art, after reading this disclosure, how to make and use other implementations of the present invention in which one or more of the steps are omitted or are performed in a different order than the one presented or simultaneously.

Figure 8:
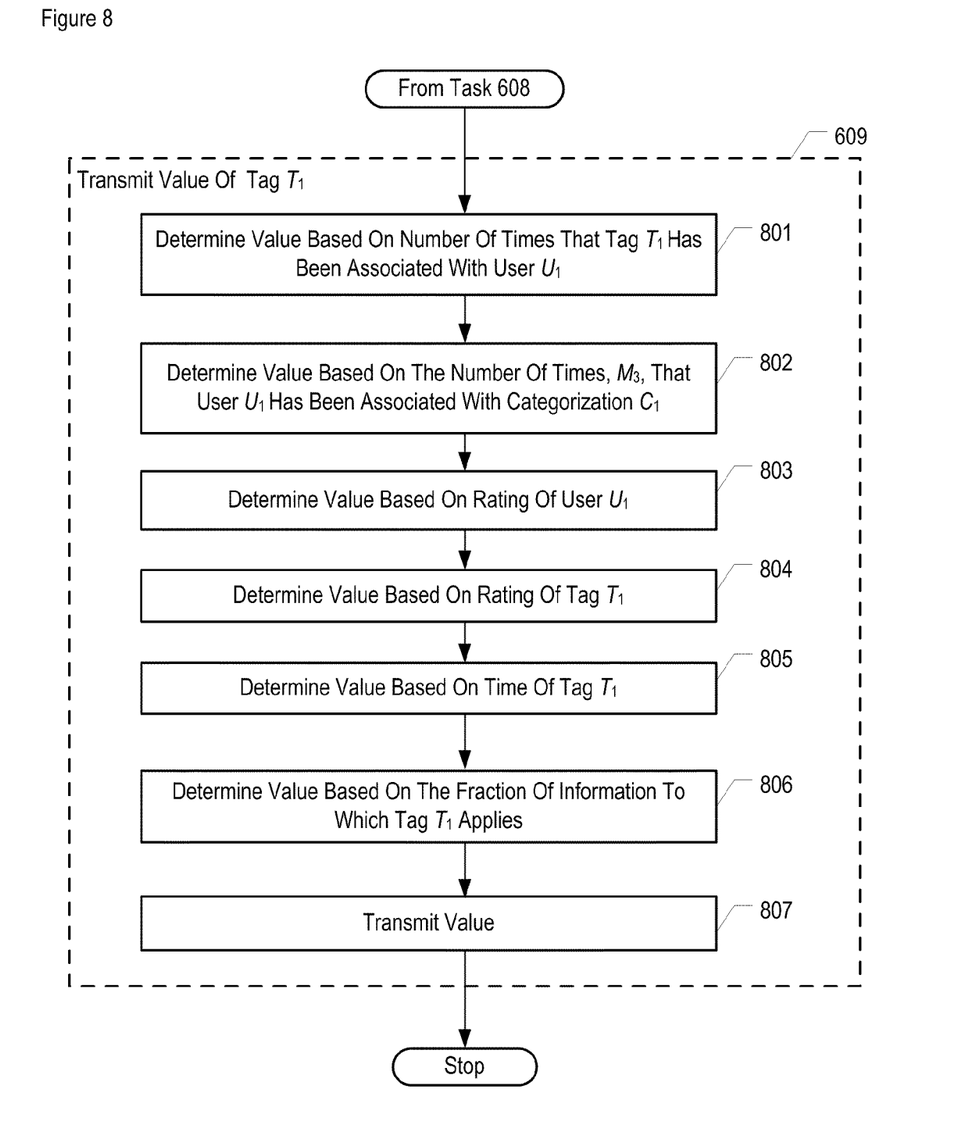
FIG. 8 depicts a flowchart of the salient tasks associated with the operation of task 610 in accordance with the illustrative embodiment of the present invention.

FIG. 8 depicts a flowchart of the salient tasks associated with the operation of task 610 in accordance with the illustrative embodiment of the present invention.

In accordance with the illustrative embodiment of the present invention, value of tag $T_1$ is based on the values received in tasks 603, 605, 607, and 608. However it will be clear to one skilled in the art, after reading this disclosure, how to make and use alternative embodiments of the present invention in which one or more of the values are omitted when determining the value transmitted.

At task 801, the value of user $U_1$ is based on the number of times that tag $T_1$ has been associated with user $U_1$ in that the more times tag $T_1$ has been associated with user $U_1$, the more expertise user $U_1$ has in the field, and the more accurate a tag is likely to be. This is because users are inclined to tag data in fields in which they are expert. The more times Alice tags items with football, the more likely she is a football expert, and a tag of "football" is more likely to be valuable coming from Alice.

At task 802, the value of tag $T_1$ is based on the number of times that user $U_1$ has been associated with categorization $C_1$. In accordance with the illustrative embodiment of the present invention, categorization $C_1$ is also associated with tag $T_1$. In accordance with the illustrative embodiment of the present invention, the tag "football" is associated with the categorization "athletics."

For example, and without limitation, the value of tag $T_1$ is based on the number of times that categorization $C_1$ has been associated with user $U_1$ in that the more times categorization $C_1$ has been associated with user $U_1$, the more expertise user $U_1$ has in the field represented by categorization $C_1$. Any tags that are assigned by an expert in the categorization are given greater value. This is because users are inclined to tag data in fields in which they are expert. The more times Alice tags items in the field of athletics, the more likely she is an athletics expert, and the more relevant the tag of "football" is determined to be.

It will be clear to one skilled in the art after reading this disclosure, how to make and use alternative embodiments of the present invention in which the value of user $U_1$ is based on the a relative number of times categorization $C_1$ is used.

At task 803, the value of tag $T_1$ is based on a rating of user $U_1$. In accordance with the illustrative embodiment of the present invention, this rating may be received, for example and without limitation, by ratings given by other users, by a value of the user determined at task 60, by a random selection, etc.

In accordance with the illustrative embodiment of the present invention, the value may be a scalar value, such as, for example and without limitation, between 1 and 5 ("Between 1 and 5, what is the expertise of user $U_1$?"), between 1 and 10, or any scalar value. However, it will be clear to one skilled in the art, after reading this disclosure, how to make and use alternative embodiments of the present invention in which the value is a binary value such as, for example and without limitation, "expert" or "not expert", or any such rating.

At task 804, the value of tag $T_1$ is based on a rating given to it. In accordance with the illustrative embodiment of the present invention this rating may be received, for example and without limitation, by ratings given by other users, by a value of the tag determined at tasks 801-803, and 806, by a random selection, etc.

In accordance with the illustrative embodiment of the present invention the value may be a binary value such as, for example and without limitation, "appropriate" or "not appropriate", "good" or "bad," or "relevant" or "not relevant," or any such rating. Also, in accordance . . . the rating may be a scalar value, such as, for example and without limitation, between 1 and 5 ("Between 1 and 5, how appropriate is this tag?"), between 1 and 10, or any scalar value.

For example, and without limitation, the tag, "Soccer," assigned to image 201-2 would be rated as not appropriate.

At task 805, the value of tag $T_1$ is based on the time of tag $T_1$. In accordance with the illustrative embodiment of the present invention, this is done by a decay function with the decay starting at the time that tag $T_1$ was assigned. In other words, the longer the time from the time that the tag $T_1$ was assigned to the time the determination is made, the less value tag $T_1$ is determined to have.

Although, in accordance with the illustrative embodiment of the present invention, this is done by a decay function, it will be clear to one skilled in the art, after reading this disclosure, how to make and use alternative embodiments of the present invention in which the value is determined by another function, for example and without limitation, a linear function.

In accordance with the illustrative embodiment of the present invention, the decay function is an exponential decay. However, it will be it will be clear to one skilled in the art, after reading this disclosure, how to make and use alternative embodiments of the present invention in which the value is determined by another function, for example and without limitation, a linear decay.

It will be it will be it will be clear to one skilled in the art, after reading this disclosure, how to make and use alternative embodiments of the present invention that perform the tasks associated with task 805.

At task 806, the value of tag $T_1$ is based on the fraction of information to which the tag applies. In accordance with the illustrative embodiment of the present invention, this would be that if only a portion of a piece of information is tagged, then that tag is deemed more relevant in that the tag is directed to a relevant portion of the information. For example and without limitation, in a several hour conversation, only a small portion may be relevant to a tag. Because the tag is specifically tailored to that portion, the value of that tag is higher than if the tag was applied to the whole of the conversation.

However, in accordance with an alternative embodiment of the present invention, the greater the fraction of the information that to which the tag applies, the greater the value. For example and without limitation, if the tag applies to the whole of the information, then the tag is relevant to the whole.

At task 807, the value is transmitted.

It will be clear to one skilled in the art, after reading this disclosure, how to make and use other implementations of the present invention in which one or more of the steps are omitted or are performed in a different order than the one presented or simultaneously.

What is claimed is:

1. A method comprising:
    receiving at a data processing system:
    (i) a first identifier of a user, $U_1$;
    (ii) a first identifier of a tag, $T_1$;
    (iii) a number of times, $M_1$, that the tag $T_1$ has been associated with the user $U_1$;
    (iv) a first identifier of a second user, $U_2$; and
    (v) a number of times, $M_3$, that the tag $T_1$ has been associated with the second user $U_2$; and
    transmitting from the data processing system a second measure, $M_2$, of a value of the user $U_1$, based on a value of $M_1$, wherein the second measure, $M_2$, is based on the value of $M_1$ and $M_3$.

2. The method of claim 1 wherein the value of $M_2$ is increased when $M_1 > M_3$.

3. The method of claim 1 wherein $M_2$ is also based on a rating of tag $T_1$.

4. The method of claim 1 wherein $M_2$ is also based on a rating of user $U_1$.

5. The method of claim 1 wherein the value of $M_2$ is also based on a third measure, $M_3$, of value of user $U_1$.

6. The method of claim 1 further comprising:
    receiving:
    (vi) a categorization, $C_1$, associated with tag $T_1$, and
    (vii) the number of times, $M_4$, that categorization $C_1$ has been associated with user $U_1$, and
    wherein $M_2$ is further based on $M_4$.

7. The method of claim 6 further comprising:
    receiving:
    (viii) the number of times, $M_5$, that categorization $C_1$ has been associated with user $U_2$, and
    wherein $M_2$ is further based on $M_5$.

8. The method of claim 1 further comprising transmitting a value of tag $T_1$ based on the value of $M_2$.

9. The method of claim 1 further comprising:
    receiving:
    (vi) a time for tag $T_1$, and
    wherein $M_2$ is further based on the time for tag $T_1$.

10. The method of claim 9 wherein $M_2$ is based on a decay function of the time for tag $T_1$.

11. The method of claim 1 wherein the value transmitted is the communicative value.

12. A system comprising:
    a processor; and
    a non-transitory computer-readable storage medium storing instructions which, when executed on the processor, perform a method comprising:
    receiving at a data processing system:
    (i) a user identifier identifying;
    (ii) a tag identifier identifying a tag;
    (iii) an relatedness number, corresponding to a number of times the user identifier has been associated with the tag identifier
    (iv) a categorization of the tag
    (v) a categorization number, corresponding to a number of times the user identifier has been association with the categorization;
    transmitting from the data processing system a tag value, the tag value being based on the relatedness number and the categorization number.

13. The method of claim 12 further comprising transmitting a user value based on the relatedness number.

14. The system of claim 12 further comprising:
    receiving:
    (vi) a time associated with the tag; and
    wherein the tag value is further based on the time.

15. The system of claim 12 wherein the tag value is based on a decay function of the time.

16. The system of claim 12 wherein the tag value is also based on a rating of the tag.

17. The system of claim 12 wherein the tag value is also based on a user rating of the user.

18. The system of claim 12 wherein the tag value is also based on a fraction of information to which the tag applies.

19. A non-transitory computer-readable storage medium storing instructions which, when executed on a computing device, cause the computing device to perform steps comprising:
    receiving at a data processing system:
    (i) a user identifier identifying;
    (ii) a tag identifier identifying a tag;
    (iii) an relatedness number, corresponding to a number of times the user identifier has been associated with the tag identifier;
    (iv) a categorization of the tag
    (v) a categorization number, corresponding to a number of times the user identifier has been association with the categorization;
    transmitting from the data processing system a tag value, the tag value being based on the relatedness number and the categorization number.

* * * * *

UNITED STATES PATENT AND TRADEMARK OFFICE
CERTIFICATE OF CORRECTION

PATENT NO. : 8,234,305 B2
APPLICATION NO. : 12/570567
DATED : July 31, 2012
INVENTOR(S) : Doree Duncan Seligmann et al.

It is certified that error appears in the above-identified patent and that said Letters Patent is hereby corrected as shown below:

On the Title Page, at Item (75), Inventors, change "Ajita John Singh" to --Ajita John--.

Signed and Sealed this
Ninth Day of April, 2013

Teresa Stanek Rea
*Acting Director of the United States Patent and Trademark Office*